United States Patent [19]

Nakagami et al.

[11] Patent Number: 4,876,719

[45] Date of Patent: Oct. 24, 1989

[54] SYNCHRONIZING SYSTEM FOR DIGITAL APPARATUS

[75] Inventors: Taro Nakagami; Takeshi Fukami, both of Kanagawa; Toshiro Terauchi, Tokyo, all of Japan

[73] Assignee: Sony Corporation, Tokyo, Japan

[21] Appl. No.: 37,382

[22] Filed: Apr. 10, 1987

[30] Foreign Application Priority Data

Apr. 10, 1986 [JP] Japan .................................. 61-82550

[51] Int. Cl.[4] ............................................... H04S 1/00
[52] U.S. Cl. ...................................... 381/1; 370/103; 370/112; 369/1; 369/4; 369/47
[58] Field of Search ....................... 370/100, 112, 103; 381/1; 369/1, 4, 83, 47, 48, 49; 360/13, 27

[56] References Cited

U.S. PATENT DOCUMENTS

| | | | |
|---|---|---|---|
| 4,347,604 | 8/1982 | Saito | 370/100 |
| 4,351,007 | 9/1982 | Youngquist | 360/13 |
| 4,744,082 | 5/1988 | Fujimura et al. | 370/112 |

*Primary Examiner*—Forester W. Isen
*Attorney, Agent, or Firm*—Hill, Van Santen, Steadman & Simpson

[57] ABSTRACT

A synchronizing system for use with a plurality of digital signal reproducers includes a plurality of digital signal reproducers, each having a digital I/O modulator, a digital I/O demodulator and a decoder; a digital signal multiplexer supplied with the output signal from the plurality of digital signal reproducers, and for producing a frame synchronizing signal, a plural channel of digital signals; the digital signal multiplexer including a clock pulse generator, a word synchronizing signal generator, a digital I/O modulator and a digital I/O demodulator. The corresponding digital I/O modulator and digital I/O demodulator are coupled to each other so as to synchronize the plurality of digital signal reproducers.

8 Claims, 8 Drawing Sheets

| CHANNEL | MODE |
|---|---|
| 1 | A OR C |
| 2 | A OR C |
| 3 | A OR B |
| 4 | A OR B |

| | BITS | MODE | CONTENTS OF SIGNAL | ENPHASIS |
|---|---|---|---|---|
| 1 | L L L | A | CD | OFF |
| 2 | L L H | A | CD | OFF |
| 3 | L H L | A | 16 BIT DIGITAL SIGNAL | OFF |
| 4 | H L L | C | #1.#2 DIGITAL DATA | OFF |
| | | B | #3.#4 8 BIT DIGITAL SIGNAL | |
| 5 | H L H | C | CD - ROM | OFF |
| 6 | H H L | - | - | - |
| 7 | L H H | - | - | - |
| 8 | H H H | - | - | - |

FIG. 9

SYNCHRONIZING SYSTEM FOR DIGITAL APPARATUS

BACKGROUND OF THE INVENTION

1. Field of the Invention

This invention relates generally to a synchronizing system for digital signal reproducing apparatus, and more particularly to such a system which synchronizes digital signal reproducing apparatus by the use of a digital signal processing apparatus as a master.

2. Description of the Prior Art

In the art, a digital transmission system for time-division-multiplexing digital output signals from a plurality of digital signal reproducing apparatus (e.g. a compact disk player) by a multiplexer and then transmitting the multiplexed digital output signals is disclosed, for example, in Japanese patent application No. 58-210353, entitled "Digital signal transmission system".

In this case, it is necessary to synchronize digital signals outputted from respective digital signal reproducing apparatus when the respective digital signals are time-division-multiplexed. However, in the conventional system, the plurality of digital signal reproducing apparatus are respectively used as a master for synchronization of the respective digital signals, so that each multiplexer is necessarily provided with a D/A converter and an A/D converter therein, incurring thereby an increase in the cost.

OBJECTS AND SUMMARY OF THE INVENTION

Accordingly, a primary object of the present invention is to provide a synchronizing system for digital signal reproducers which can improve the above-mentioned defect.

Another object of the present invention is to provide a synchronizing system for digital signal reproducers which is provided with a digital interface between a plurality of digital signal reproducers and a digital signal multiplexer.

In accordance with one example of the invention, a synchronizing system for use with a plurality of digital signal reproducers is provided, which includes:

(a) a plurality of digital signal reproducers, each having a digital I/O modulator, a digital I/O demodulator and a decoder;

(b) a digital signal multiplexer supplied with the output signal from the plurality of digital signal reproducers, and for producing a frame synchronizing signal, a plural channel of digital signals; the digital signal multiplexer including means for generating a clock pulse, a word synchronizing signal, a digital I/O modulator and a digital I/O demodulator;

(c) circuit connecting means for interfacing the digital I/O modulator of the digital signal multiplexer and each digital I/O demodulator of the plurality of digital signal reproducers so as to supply a demodulated clock pulse and a word synchronizing signal to each decoder thereof; and (d) circuit connecting means for interfacing each digital I/O modulator of the plurality of digital signal reproducers and the digital I/O demodulator of the digital signal multiplexer so as to transmit the decoded data of the decoder to the digital signal multiplexer.

These and other objects, feature and advantages of the present invention will become apparent from the following detailed description of the preferred embodiments taken in conjunction with the accompanying drawings, throughout which like reference numerals designate like elements and parts.

DESCRIPTION OF THE PREFERRED EMBODIMENTS

Now, an embodiment of the present invention will hereinafter be described with reference to the accompanying drawings.

FIGS. 1A–1E are diagrams respectively showing an example of a format of a digital signal Sd when a plurality of digital data are transmitted.

Figure 1A:
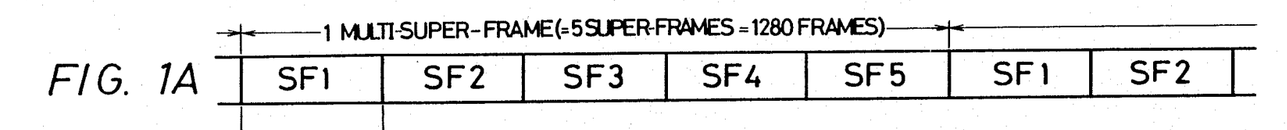
FIGS. 1A through 1E are diagrams respectively showing a format of a digital signal reproduced by a digital signal multiplexer according to the present invention.
Figure 1B:
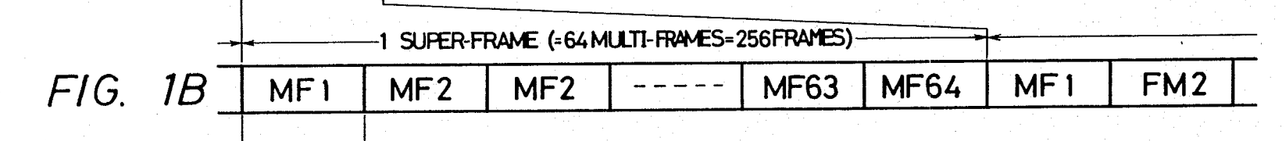
Figure 1C:
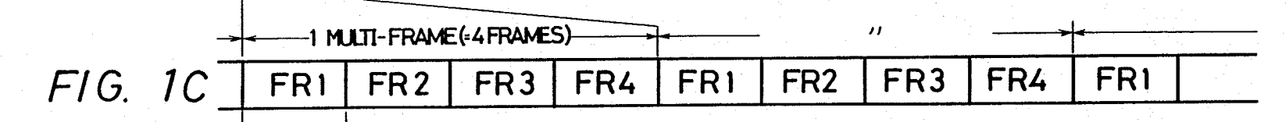
Figure 1D:
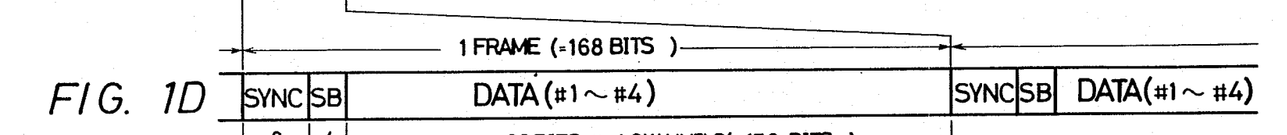

Referring to FIG. 1D, the digital signal to be transmitted is a binary signal which takes a value "0" or "1". 168 bits of the digital signals are determined as a basic unit which forms one frame FR. A cyclic period of the frame FR is determined as $1/44.1$ kHz $= 22.7$ sec.

As shown in FIG. 1C, a multi-frame MF is formed of 4 frames FR1–FR4, and a super-frame SF is formed of 64 multi-frames MF1–MF64, as shown in FIG. 1B. Further, a multisuper-frame is formed of 5 super-frames SF1–SF5.

Each frame FR comprises an 8-bit synchronizing code SYNC, a 4-bit service SB and a 156-bit data bit DATA in this order, as shown in FIG. 1D.

In this case, the synchronizing codes SYNC are made different in a bit pattern between first frames FR1 of the frame MF and the super-frame SF so that they can be distinguished as the first ones of these two frames MF and SF. The service bit SB, as will be later described in detail, has information with respect to the data bit DATA.

Figure 3:
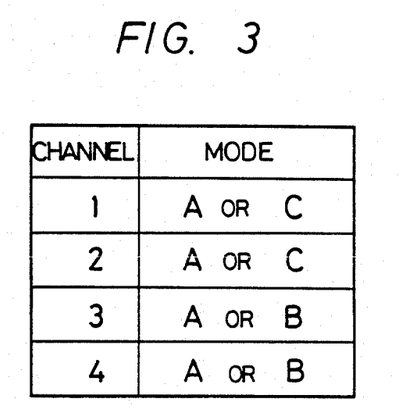
FIGS. 3 through 7 are diagrams showing formats of digital signals in detail.
Figure 5:
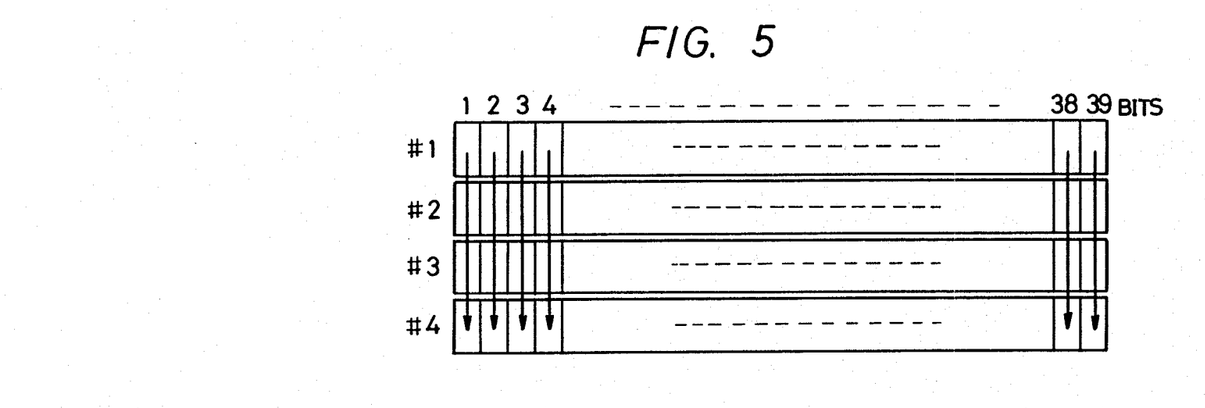

The data bit DATA has its 156 bits divided into 4 independent channels #1–#4, each having 39 bits, as shown in FIG. 5, and used in this form. Each of the channels #1–#4 has its available modes determined as shown in FIG. 3.

Figure 4:
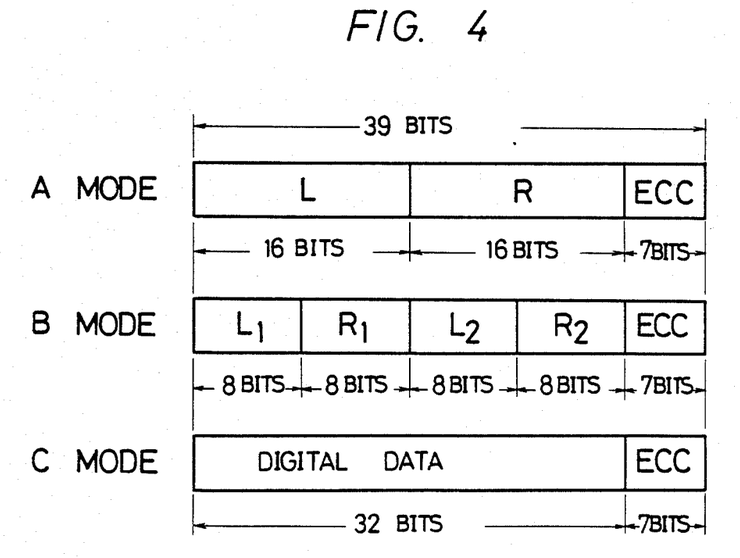

These modes respectively have specified formats and signal contents as shown in FIG. 4. To be specific, an A mode comprises left and right stereo audio signals L and R sampled by a sampling frequency of 44.1 kHz and encoded in 16-bit PCM signals and a 7bit error correcting code ECC formed e.g. of a BCH code added thereto, which corresponds to a digital signal reproduced by a compact disk player (CD player).

A B mode comprises 2 sets of stereo audio signals $L_1$, $R_1$ and $L_2$, $R_2$ sampled by a sampling frequency of 44.1 kHz and encoded in 8-bit PCM signals and a 7-bit error correcting code ECC added thereto. Incidentally, stored in a channel in the B mode are signals $L_1$–$R_2$ for which a noise reduction is effected by compression or extension thereof.

A C mode comprises 32-bit digital data, e.g. programs and data for a computer, image data, data reproduced from a CD-ROM, and so on, and a 7-bit error correcting code ECC added thereto. It should be noted that in the C mode, one multi-frame MF, that is, 156 bits (=39 bits ×4 frames) is determined as a basic unit which is timed-divided and then used, according to the necessity, by a plurality of digital data to be transmitted at a bit unit. Therefore, the C mode allows maximum 128 kinds of digital data per channel to be transmitted at a bit rate of 1 bit/1 multi-frame (= 1 bit/ (((1/44.1 kbps) ×4 frames) ≅11.025kbps), or if one kind of digital data is transmitted, it can be transmitted at a bit rate of 128 bits/1 multi-frame (=128 bits/ ((1/44.1 kbps) ×4 frames) ≅1.41 Mbps).

Figure 1E:
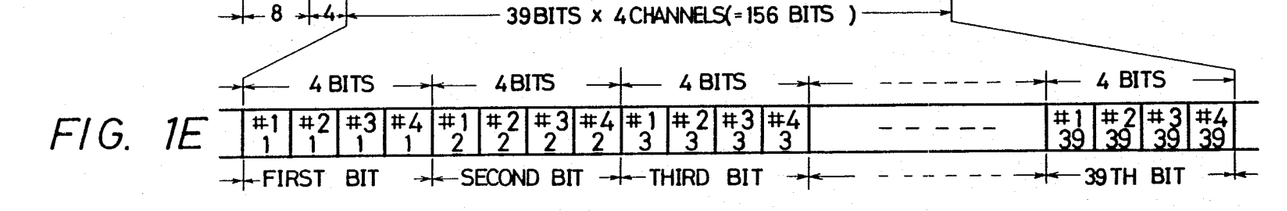

The data bit DATA of 156 bits, as shown in FIG. 1E and as the sequence (time series) indicated by arrows in FIG. 5, are constructed in a manner that data is fetched out one bit by one bit from each of the channels #1–#4 in turn and serially placed in frame FR.

Figure 6:
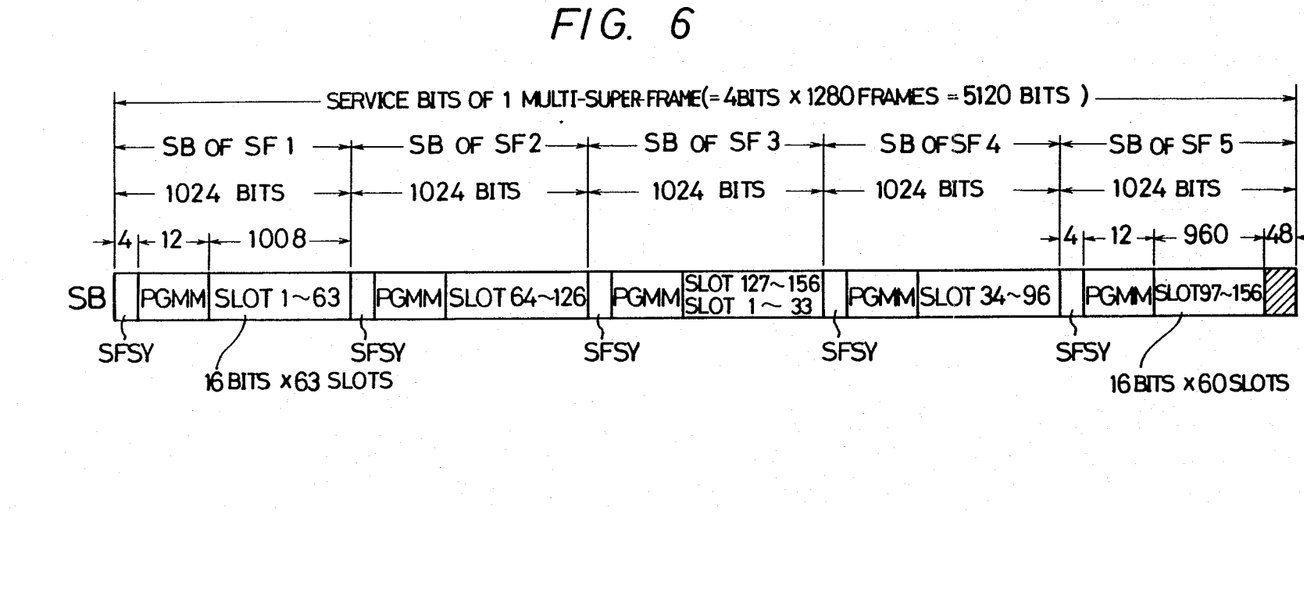

The service bit SB has a format determined as shown in FIG. 6. To be specific, FIG. 6 shows only service bits SB contained in one multisuper-frame in order. Therefore, 1024-bit data blocks from the head are respectively assigned as the service bit SB for super-frames SF1–SF5. First 4-bit data SFSY of the service bit SB in each of the super-frames SF1–SF5 is a synchronizing code indicative of a start point of the service bit SB in each multi-super-frame SF which has a particular bit pattern determined. Particularly, the synchronizing code SFSY of the first multi-super-frame SF1 indicates a start point of the service bit SB of each multisuper-frame so that it has a bit pattern different from those of the other super-frames SF2–SF5.

Figure 7:
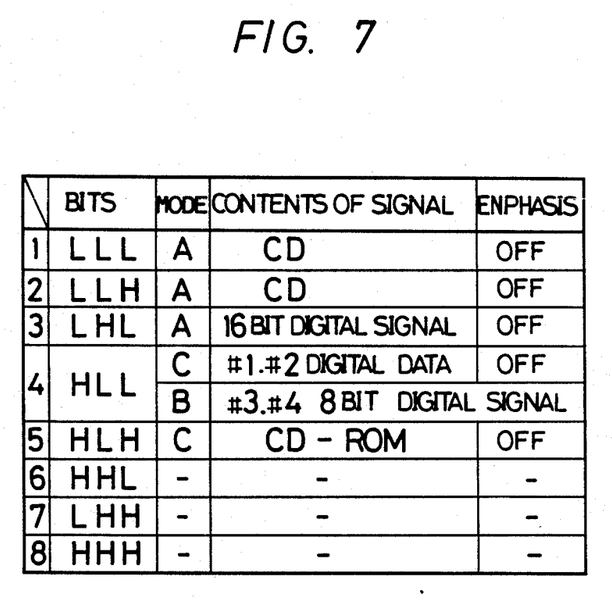

A 12-bit data RGMM following to the synchronizing code SFSY is divided into 4 channels by the unit of 3-bit data and each of 3-bit data is a mode data which indicates a mode of each of the channels #1–#4. FIG. 7 shows an example of a relationship between the contents of the data PGMM and the modes.

The rest 1008bits are divided into 63 slots SLOTs by 16 bits, each of which indicates information on the channel #1 and #2, e.g. arrangement of the data bit DATA, category of service (contents of signal), password, address and so on. Incidentally, the service bit SB in the fifth multi-super-frame SF5 has only 60 slots used and the rest 48 bits left unused.

In the signal format as described above the transmission bit rate of the digital signal Sd is calculated as follows:

168 bits×44.1 kHz≅7.4 Mbps

Then, the band width required to transmit the digital signal Sd, as is half as much the transmission bit rate, is calculated as follows:

7.4 Mbps / 2=3.7 MHz

Therefore, the digital signal Sd can be accommodated within the band width for a baseband video signal in the television broadcasting, i.e. 4.5 MHz, so that any channel for the television broadcasting can be used to transmit the digital signal Sd. In other words, if there is an available band which can transmit a video signal, 4-channel data in any of A–C modes shown in FIG. 4 can be transmitted.

Figure 8:
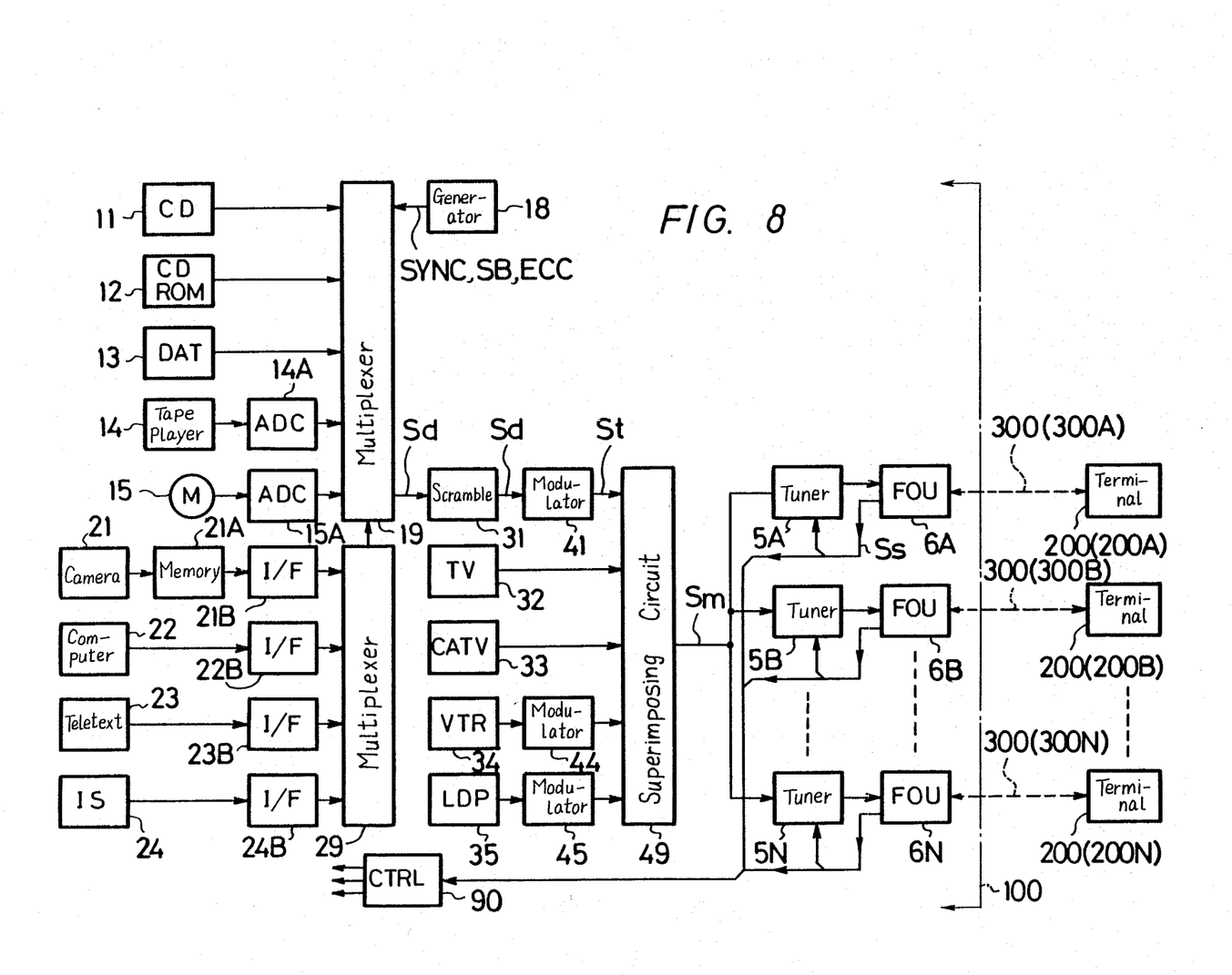
FIGS. 8 and 9 are block diagrams showing a circuit configuration of an embodiment which transmits a digital signal from a center to each terminal through an optical circuit.
Figure 9:
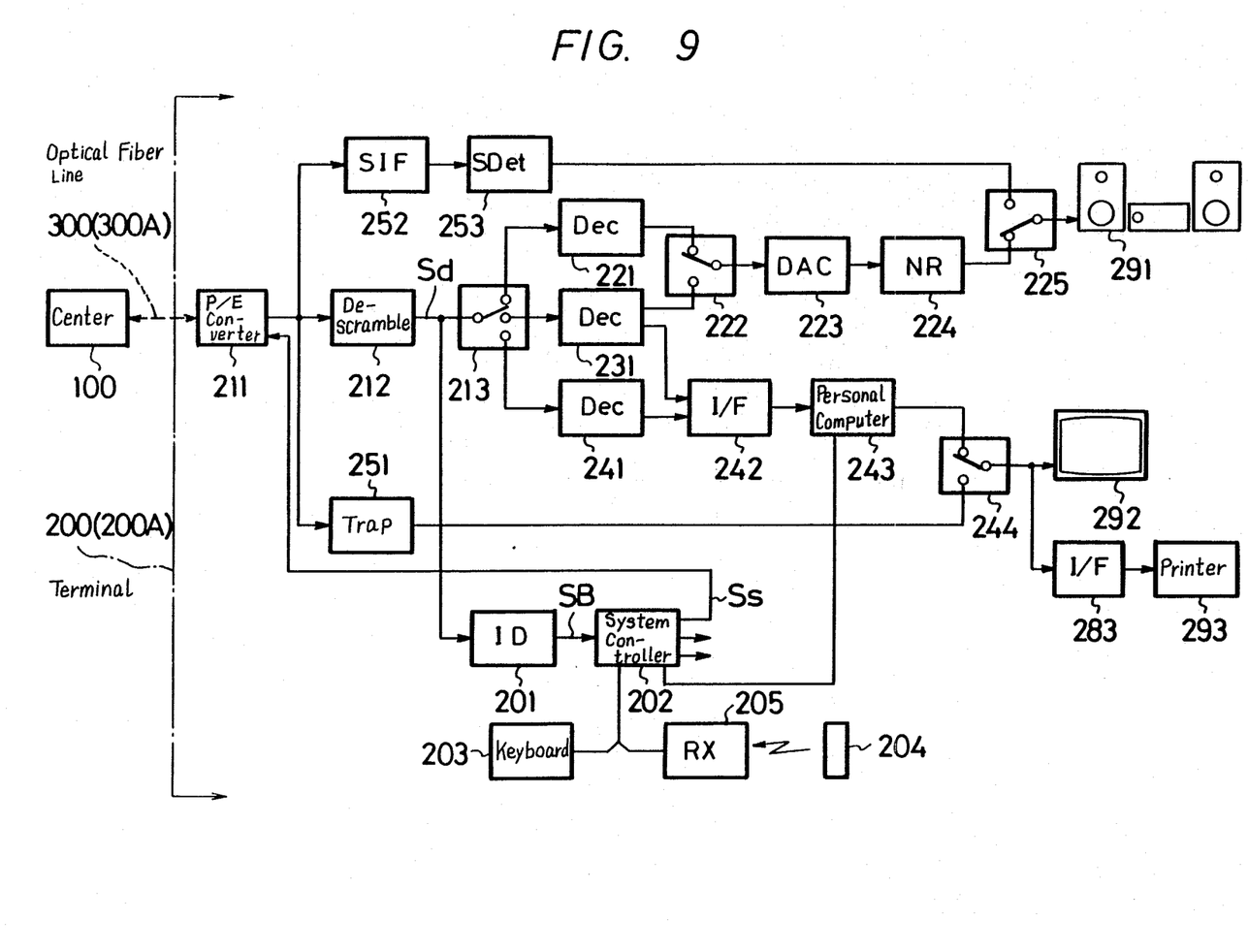

FIGS. 8 and 9 show an example of a bi-directional CATV system by an optical communication using the digital signal Sd formatted as described above.

In FIG. 8, reference numeral 100 designates a CATV center and 200 terminals. Let it assumed, as an example that the center 100 can cover a service area as large as a telephone station, the terminals 200 are installed in families and offices, and the center 100 and the terminals 200 are connected to each other by bi-directional optical fiber lines 300.

In the center 100, reference numerals 11–15 designate signal sources of signals which are mainly transmitted in A mode or B mode. More specifically, reference numeral 11 designates a CD player, 12 a CD-ROM player (drive unit), 13 a DAT player, 14 an analog tape player, and 15 a microphone. Digital signals reproduced by players 11–13, after their errors contained in the digital signals are corrected, are supplied to a multiplexer 19. On the other hand, analog signals from the player 14 and the microphone 15 are supplied to A/D converters 14A and 15A to be converted into digital signals which are then also supplied to the multiplexer 19. Further, the error correction code ECC, synchronizing code SYNC and then service bit SB are generated by a generation circuit 18 and then supplied to the multiplexer 19.

Reference numerals 21–24 designate signal sources of signals which are mainly transmitted in C mode. To be specific, reference numeral 21 designates a video camera 22 a computer, 23 a teletext receiver apparatus, and 24 an image scanner. A video signal from the camera 21 is supplied to a memory circuit 21A, wherein the video signal is converted into a digital signal and one field or one frame portion thereof is stored in a memory of the memory circuit 21A. Then, the image data stored in the memory circuit 21A is read out at a predetermined speed as a serial data. Therefore, a video signal representative of a still image is derived from the memory 21A as a serial digital signal. This serial digital signal is next supplied to a multiplexer 29 through as RS-232C interfaces 21B.

Further, the output signals from the signal sources 22–24 are derived as serial digital signals and suppled to the multiplexer 29 through RS-232C interfaces 22B–24B, respectively.

The digital signals supplied to the multiplexer 29 is selected and multiplexed to a C mode signal (the error correcting code ECC is not yet added thereto) in the time-division manner. Then, the C mode signal is supplied to the multuplexer 19. In the multiplexer 19, one of the digital signals supplied thereto is selected, added with the error correcting code ECC generated by the generation circuit 18 to form an A mode, B mode or C mode signal, and thereafter distributed to the channels #1–#4. The distributed signals are added with the synchronizing code SYNC and service bit SB to form the digital signal Sd formatted in the aforementioned manner which is outputted from the multiplexer 19.

By the way, the CD player 11 comprises e.g. 4 CD players. In the same manner, the other signal sources and rear circuits also respectively represent a plurality of the same apparatus or circuits.

Reference numeral 90 designates a master controller comprising a microcomputer. Though not shown, the master controller 90 supplies control signals to the signal sources 11–15 and 21–24, their rear circuits 14A, 15A, 21A and 21B–24B, the multiplexers 19 and 29, and the generation circuit 18 in a manner that a desired signal in the signals delivered from the signal sources 11–15 and 21–24 is multiplexed to the digital signal Sd in the time-division manner.

The signal Sd is supplied to a scrambling circuit 31 to be scrambled. The scrambled signal Sd is then supplied to a modulator circuit 41 to be modulated to a television signal St for a free channel, that is, the same signal St as a signal VSB-modulated by a video signal in the ordinary television broadcasting, which is supplied to a superimposing circuit 49.

Reference numerals 32–35 designate signal sources of video signals. To be specific, reference numerals 32 and 33 respectively designate a receiver apparatus for receiving ordinary television broadcasting and a receiver apparatus for receiving other CATV broadcasting, respectively formed e.g. of an RF amplifier. A receiver television signal (plural channels), which is adjusted its level but is not demodulated, that is, the received signal as it is, is supplied to the superimposing circuit 49, without being changed from the television signal received by a channel.

Further, reference numeral 34 is a player for reproducing e.g. a U-standard cassette videotape, and 35 a laser disk player. A video signal and an audio signal reproduced by these players are supplied to modulator circuits 44 and 45 to be modulated to television signals for a free channel which are supplied to the superimposing circuit 49. Incidentally, the players 34, 35 and the modulator circuits 44, 45 also represent a plurality of players and circuits.

Therefore, the superimposing circuit 49 delivers a superimposed signal Sm formed by frequency-multiplexing the signal St and all the television signals supplied from the receivers 32, 33 and modulator circuits 44, 45.

The signal Sm is supplied to tuner circuits 5A–5N, provided corresponding to the terminals 200A–200N, each of which has the stage from a channel selecting stage (tuner) to an image detecting stage. Therefore, the tuner circuits 5A–5N output, according to a channel selection, the signal St or a composed signal formed of a baseband video signal and an audio intermediate frequency signal of the concerned channel. The channel selection effected by the tuner circuits 5A–5N depends on a selection signal delivered from a corresponding one of the terminals 200A–200N. It can therefore be understood that the superimposing circuit 49 and the tuner circuits 5A–5N as a whole operate as a selecting switch for selecting one from the signal St and various video signals (and audio intermediate frequency signals).

The signal St and video signals from the tuner circuits 5A–5N are supplied to photo-electric converters 6A–6N to be converted into optical signals which in turn are transmitted to the terminals 200A–200N through the optical fiber lines 300A–300N.

Incidentally, the optical fibers 300 in this system transmit an optical signal coverted from the baseband signal Sd or video signal for only one channel, so that low-price optical fibers may be used. Also for the photo-electric converters 6A–6N or the like, low-price apparatus may be used.

On the other hand, each of the terminals 200 is constructed as described below with reference to FIG. 9.

In FIG. 9, reference numeral 202 designates a system controller comprising a microcomputer which, in response to input operations on an input keyboard 203, supplies control signals to respective circuits to effect various functions which will be explained later. When the terminal 200 receives the digital signal Sd, the system controller 202 generates the control signals also with reference to the service bit SB contained in the digital signal Sd.

Reference numeral 204 is a remote control commander which uses e.g. infrared rays, and 205 a receiver circuit which receives command signals transmitted from the commander 204. The output from the receiver circuit 205 is supplied to the system controller 202, so that the terminal 200 is controlled to effect various functions by the commander 204 as well as the input keyboard 203.

When a channel in the signal Sm is selected by the input keyboard 203 or the commander 204, a selection signal Ss indicative of the selected channel is generated by the system controller 202 and supplied to an photoelectric converter 211 to be converted into an optical signal which is then transmitted to the CATV center 100 through the optical fiber line 300. If the optical signal comes from e.g. the terminal 200A, it is first supplied to the photo-electric converter 6A through the optical fiber line 300A and then converted again into the original electrical selection signal Ss. The signal Ss is finally supplied to the tuner circuit 5A in which the channel selected by the input keyboard 203 or the commander 204 is selected. Therefore, the terminal 200A is supplied with an optical signal converted from one of the signal Sd or video signals of the channel selected by the keyboard 203 or commander 204.

When an optical signal is transmitted to the terminal 200, it is first supplied to the photo-electric converter 211 to be restituted to the original signal Sd or video signal (and audio intermediate frequency signal).

If the digital signal Sd is selected, the signal outputted from the photo-electric converter 211 is supplied to a descrambling circuit 212 to be descrambled to the original digital signal Sd which is supplied to an identifying (ID) circuit 201 wherein the contents of the signal Sd is identified with reference to the service bit SB. The identification result is supplied to the system controller 202.

To be more specific, if selected is a stereo signal in A or B mode of the signal Sd (e.g. a signal reproduced by the CD player 11), the signal Sd outputted from the descrambling circuit 212 is supplied through a switching circuit 213 to a decoder 221 in which a desired digital signal is separated from corresponding one of the channels #1–#4 and an error correction and an error concealing are effected on the separated digital signal.

The digital signal Sd subjected to the above processings is suppled through a switching circuit 222 to a D/A converter 223 to be converted into the original analog stereo signals L, R ($L_1$, $R_1$ or $L_2$, $R_2$). The stereo signals are supplied to an audio reproducing apparatus 291 through a noise reduction circuit 224 and a switching circuit 225, whereby the stereo signals are reproduced in A or B mode. The noise reduction circuit 224 is turned on if the signal is in B mode and turned off (though) if the signal is in A mode.

If selected is digital signal of A mode in the signal Sd which is a program or data for the computer (e.g. a signal reproduced by the CD-ROM player 12), the signal Sd outputted from the descrambling circuit 212 is supplied through the switching circuit 213 to a decoder 241 in which a desired digital signal is separated from corresponding one of the channels #1–#4 and only the error correction is effected on the separated digital signal. Then, the signal after the error correction is supplied to a personal computer 243 through an interface 242.

The computer 243 outputs a video signal, in accordance with the digital signal, which is supplied through a switching circuit 244 to a monitoring apparatus 292 which displays processing results of the computer 243.

In this operation, a portion of the digital signal from the switching circuit 244 is supplied through an interface 283 to a printer 293 so as to be able to hard-copy a display on the screen of the monitoring apparatus 292.

if selected is a digital signal of A mode in the signal Sd which comprises both image data and audio data, the signal Sd outputted from the descrambling circuit 212 is supplied through the switching circuit 213 to a decoder 231 in which a desired digital signal is separated from corresponding one of the channels #1–#4, only the error concealing is effected on the image data of the separated digital signal, and both the error correction and error concealing are effected on the audio data of the separated digital signal.

Then, the audio data from the decoder 231 is supplied through the switching circuit 222 to the D/A converter 223. On the other hand, the image data from the decoder 231 is supplied through the interface 242 to the computer 243. Therefore, the audio data is reproduced by the audio reproducing apparatus 291 and the image data by the monitoring apparaus 292.

Incidentally, if data reproduced from a CD-ROM by the player 12 is desired to be obtained, address signals such as a track number of the CD-ROM and control signals such as a seek signal are inputted from the computer 243 by way of the system controller 202, the keyboard 203 or the commander 204 and supplied to the photo-electric converter 211 as a part of the signal Ss from the system controller 202 to be converted into optical signals which in turn are transmitted to the center 100 through the optical fiber line 300.

Assuming that the optical signal Ss is transmitted from the terminal 200A, the signal Ss is received by the photo-electric converter 6A and supplied to the controller 90 which controls the player 12, in accordance with the signal Ss, to reproduce the data specified by the computer 243 or the system controller 202. The reproduced data is transmitted to the terminal 200A.

If selected is a digital signal in C mode of the signal Sd (e.g. a video signal produced by the camera 21), the signal Sd outputted from the descrambling circuit 212 is supplied through the switching circuit 213 to the decoder 241 wherein the digital signal is separated from corresponding one of the channels #1 and #2 and an error correction is effected on the separated digital signal. The digital signal after the error correction is supplied to the interface 242 wherein only desired bits are selected from digital data DATA time-divided by bit unit and supplied to the computer 243. Then, an image reproduced from the data supplied to the computer 243 is displayed on the screen of the monitoring apparatus 292, in the same manners described above.

Further, if selected is a video signal (with an audio intermediate frequency signal) from one of the signal sources 32–35 by the input key board 203 or commander 204, the concerned video signal can be obtained from the photo-electric converter 211 and supplied through a trap 251 for the audio intermediate frequency signal and the switching circuit 244 to the monitoring apparatus 292 which displays an image by the video signal on the screen thereof.

In the above described processing of the video signal, the audio intermediate frequency signal from the photo-electric converter 211 is supplied through an audio intermediate frequency amplifier 252 to an audio detecting circuit 253 to be demodulated. Then, the demodulated audio signal is supplied through the switching circuit 225 to the audio reproducing apparatus 291 to be reproduced.

The CATV system as described above can transmit a variety of video signals, audio signals and data from which users can select desired data.

Figure 2:
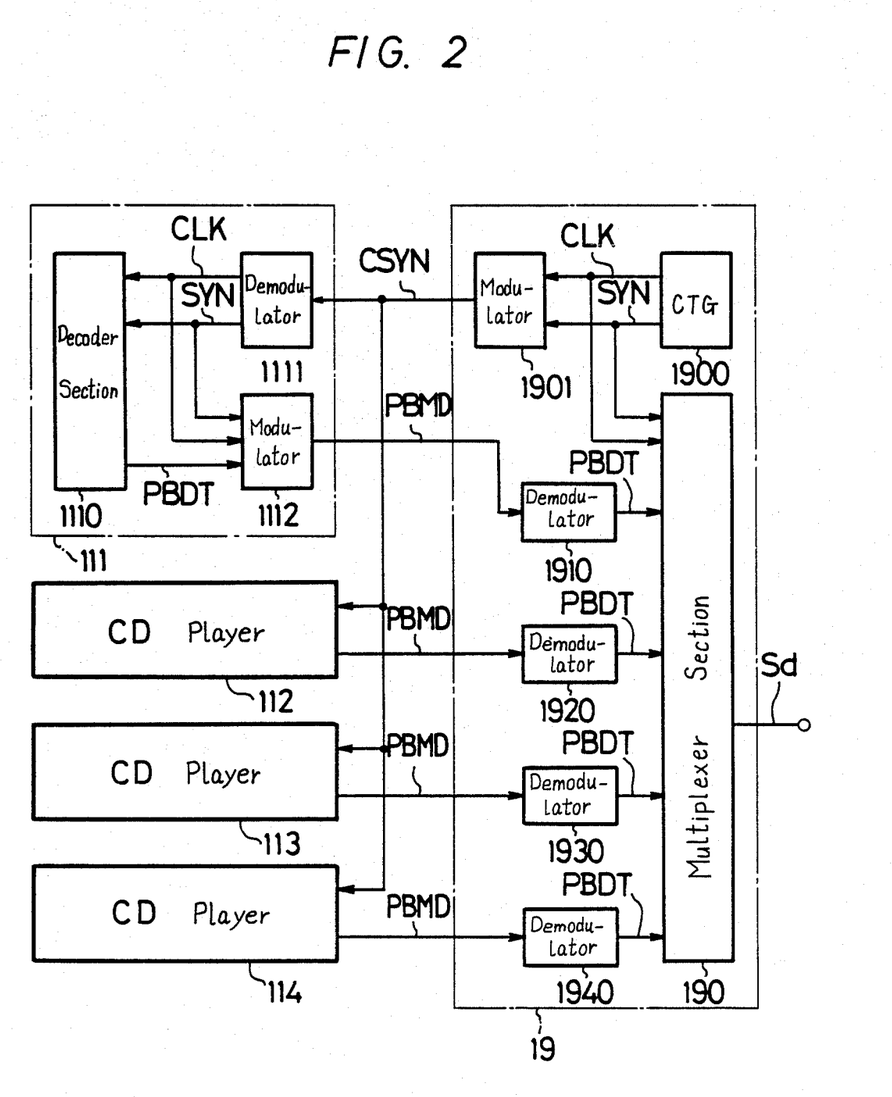
FIG. 2 is a circuit block diagram showing a circuit configuration of an embodiment of the present invention.

According to the present invention, in addition to the CATV system as shown in FIG. 8, the multiplexer 19 supplies a clock signal and synchronizing signal to players 111–114 shown in FIG. 2 so that the players 111–114 are operated in synchronism with the clock signal or synchronizing signal.

A synchronizing system of the present invention is hereinafter explained with reference to FIG. 2.

In FIG. 2, the multiplexer 19 is provided with a clock timing generator 1900 which generates a clock CLK (bit clock) and a synchronizing signal SYN such as a frame synchronizing signal. These signals CLK and SYN are supplied to a digital I/O modulator circuit 1901 wherein the signals CLK and SYN are composed to form a digital I/O signal, i.e. a composite digital signal CSYN which has a predetermined format. The signal CSYN is supplied to the CD player 111.

Figure 10A:
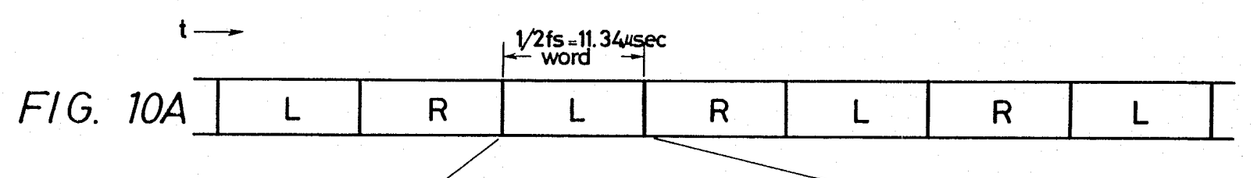
FIGS. 10A–10C are a diagram showing a format of a digital audio interface.
Figure 10B:
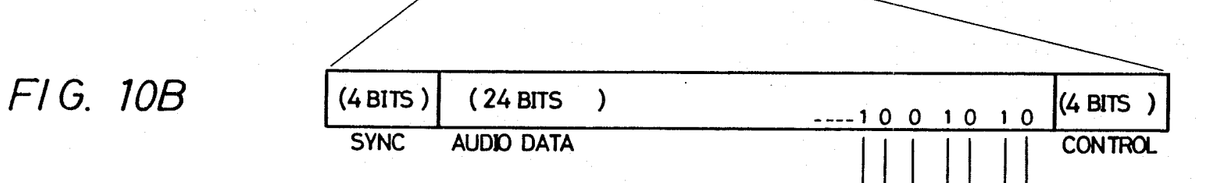
Figure 10C:
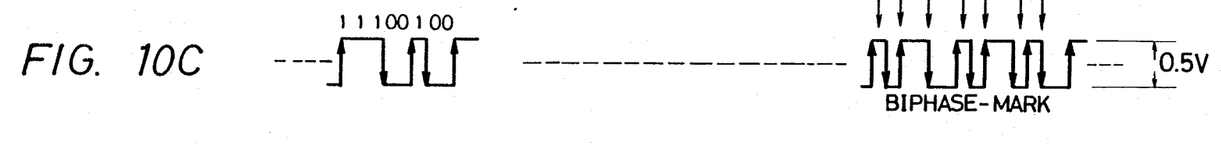

An example of a digital audio interface format will be explained with reference to FIGS. 10A–10C. L channel data and R channel data are alternatively transmitted with a cyclic period being ½fs (11.34 μsec) in the time-division manner (FIG. 10A). An example of the modulated data has a frame formed of portions for a word synchronizing signal (4 bits), an audio data 24 bits, 16 bits of which are used) and a control signal (4 bits), as shown in FIG. 10B. The word synchronizing signal portion contains a particular pattern (11100100). The 16-bit audio data portion is modulated in a manner called "biphase mark" wherein data is inverted once by a value "0" and twice by a value "1", as shown in FIG. 10C. The audio data is transmitted as a predetermined data and reproduced, when received, as a bit clock (CLK). Further, the word synchronizing signal is reproduced as the above frame synchronizing signal (SYN).

Next, in the player 111, the signal CSYN supplied thereto is supplied to a digital demodulator circuit 111 to be separated into the original clock CLK and synchronizing signal SYN which are then supplied to a decoder section 1110 of the player 111 which reproduces digital data PBDT from a CD, not shown, in synchronism with the signals CLK and SYN and effects the error correction and error concealing on the reproduced digital signal.

Then, a digital I/O modulator circuit 1112 of the player 111 is supplied with the reproduced data PBDT as well as the signals CLK and SYN from the demodulator circuit 1111 so that the signal PBDT is modulated to the above-mentioned digital signal PBMD having the predetermined format which is synchronized with the signals CLK and SYN. The signal PBMD is supplied to the multiplexer 19.

In the multiplexer 19, the signal PBMD is supplied to a digital I/O demodulator circuit 1910, wherein the original reproduced data PBDT is derived from the signal PBMD and supplied to a multiplexer section 190.

The same operation is effected for the other players 112-114, wherein the signals PBMD are obtained in synchronism with the signals CLK and SYN separated from the signal CSYN supplied from the multiplexer 19 and supplied to demodulator circuits 1920-1940, wherein the reproduced data PBDT are obtained and then supplied to the multiplexer section 190.

In the above described operation, the generator 1900 supplies the multiplexer section 190 with the signals CLK and SYN so that the reproduced data PBDT from the players 111-114 are multiplexed, in the time-division manner, to the channel #1–#4 in synchronism with the signals CLK and SYN, to be outputted as the digital signal Sd.

Particularly, according to the present invention, the players 111-114 are commonly supplied from the multiplexer 19 with the clock CLK and synchronizing signal SYN required to reproduce signals from a CD, so that the reproduced data PBDT are all synchronized with each other. It is therefore possible to multiplex in the time-division manner the reproduced date PBDT in the multiplexer section 190 without D/A conversion and A/D conversion, whereby the reproduced data from a CD is not deteriorated when it is received by the terminal 200.

The above description is given to a case where the reproduced data from 4 CD players 111-114 are multiplexed in the time-division manner. For other cases, for example, when the decoder section 1110 and D/A converter of the CD player are separately accommodated in different cabinets or the like in the CD player, if the analog signal is reproduced in a manner that the signal CSYN is transmitted from the D/A converter, i.e. a data processing section to the reproducing section 1110 to obtain the reproduced data PBDT which in turn is transmitted to the D/A converter to be converted into a corresponding analog signal, a PLL (Phase Locked Loop) is not necessary for D/A conversion, and consequently, the reproduced analog signal is prevented from deterioration due to jitters or fluctuations produced by the PLL.

Further, the other players 12, 13, converters 14A, 15A, and so on are also operated with the common clock and synchronizing signal, so that it is possible to obtain synchronized data.

Also, the switching circuit 244 can not only change over video signals supplied thereto but also mix and superimpose the signals.

It will be clearly understood from the explanation given above that according to the present invention, since the players 111-114 are commonly supplied from the multiplexer 19 with the clock CLK and synchronizing signal SYN required to reproduce a signal from a CD to thereby obtain the reproduced data PBDT, the reproduced data PBDT are all synchronized with each other, so that it is possible to multiplex in the time-division manner the reproduced data PBDT in the multiplexer section 190 without D/A conversion and A/D conversion, whereby the reproduced data from a CD is not deteriorated when it is received by the terminal 200.

The above description is given on the preferred embodiment of the invention but it will be apparent that many modifications and variation could be effected by one skilled in the art without departing from the spirits or scope of the novel concepts of the invention so that the scope of the invention should be determined by the appended claims only.

We claim as our invention:

1. A synchronizing system for use with a plurality of digital signal reproducers comprising;
    a plurality of digital signal reproducers, each producing an output signal and having a digital I/O modulator, a digital I/O demodulator and a decoder for producing decoded data,
    a digital signal multiplexer supplied with the output signals from said plurality of digital signal reproducers, and for producing a frame synchronizing signal and a multiplex output signal,
    said digital signal multiplexer including means for generating a clock pulse and a word synchronizing signal, a digital I/O modulator, and digital I/O demodulator for each of said reproducers,
    circuit connecting means for interfacing the digital I/O modulator of said digital signal multiplexer and each digital I/O demodulator of said plurality of digital signal reproducers, so as to supply a demodulated clock pulse and a word synchronizing signal to each decoder thereof, and
    circuit connecting means for interfacing said digital I/O modulator of each of said plurality of digital signal reproducers and the respective digital I/O demodulator of said digital signal multiplexer so as to transmit said decoded data of each said decoder to said digital signal multiplexer, said digital signal multiplexer producing a time-division multiplex signal arranged in a frame format including;
    (a) a word synchronizing signal,
    (b) a service bit signal indicating a transmission mode, and
    (c) a channel of digital data whereby the digital signals from said plurality of digital reproducers are multiplexed as indicated by said service bit signal.

2. A synchronizing system according to claim 1, in which said channel of digital data includes L, R channels of audio digital signals each being sampled by 44.1 kHz and coded in 16 bits.

3. A synchronizing system according to claim 1, in which said channel of digital data includes L, R channels of audio digital signals each being sampled by 44.1 kHz and coded in 8 bits.

4. A synchronizing system according to claim 1, in which said channel of digital data includes a computer program.

5. A synchronizing system according to claim 1, in which the digital I/O modulator of each of said digital signals reproducers produces a digital format signal including said word synchronizing signal from said generating means, audio data and a control data.

6. A synchronizing system according to claim 5, in which said audio data is modulated by bi-phase mark.

7. A synchronizing system according to claim 5, in which said digital I/O demodulator of each digital reproducer demodulates said word synchronizing signal and the clock pulse signal so as to supply the same to the decoder.

8. A synchronizing system according to claim 7, in which each respective digital I/O demodulator of said digital signal multiplexer demodulates said digital audio data from each respective digital I/O modulator of said plurality of digital signal reproducers.

* * * * *